US006219226B1

(12) United States Patent
Bullington et al.

(10) Patent No.: US 6,219,226 B1
(45) Date of Patent: Apr. 17, 2001

(54) COMPUTER CHASSIS WITH RETRACTABLE ACCESS DOOR

(75) Inventors: James Bullington, Athens; William S. Pesto, Madison, both of AL (US)

(73) Assignee: Intergraph Corporation, Huntsville, AL (US)

( * ) Notice: Subject to any disclaimer, the term of this patent is extended or adjusted under 35 U.S.C. 154(b) by 0 days.

(21) Appl. No.: 09/260,845

(22) Filed: Mar. 2, 1999

Related U.S. Application Data

(60) Provisional application No. 60/077,239, filed on Mar. 9, 1998.

(51) Int. Cl.$^7$ ............................................. G06F 1/16
(52) U.S. Cl. ..................... 361/683; 361/679; 361/725; 312/223.2
(58) Field of Search .................. 361/679, 683, 361/684, 685, 724, 725, 727, 728, 730, 731, 752; 312/223.2, 223.3; 400/713, 714; 206/320, 576

(56) References Cited

U.S. PATENT DOCUMENTS

| 4,997,103 |   | 3/1991  | Daly ................................. 220/346 |
|-----------|---|---------|------------------------------------------------|
| 5,395,165 | * | 3/1995  | Woerner ............................. 312/110  |
| 5,450,285 | * | 9/1995  | Schlemmer ......................... 361/724    |
| 5,574,625 | * | 11/1996 | Ohgami et al. ..................... 361/684    |
| 5,738,536 | * | 4/1998  | Ohgami et al. ..................... 439/142    |

FOREIGN PATENT DOCUMENTS

| 0 424 558 A1 | 5/1991  | (EP) . |
| 0 798 623 A1 | 10/1997 | (EP) . |
| 2 739 948    | 4/1997  | (FR) . |

OTHER PUBLICATIONS

IBM Technical Disclosure Bulletin, "Plastic Front Cover Assembly," vol. 37, No. 08, Aug. 1994.
"Silicon Graphics 320™ Visual Workstation Owner's Guide," pp. 9–13, Nov. 18, 1998.

* cited by examiner

Primary Examiner—Leo P. Picard
Assistant Examiner—Hung Van Duong
(74) Attorney, Agent, or Firm—Bromberg & Sunstein LLP

(57) ABSTRACT

An internal component within the interior of a computer chassis is accessible via a chassis door that may be moved into the chassis interior. To that end, the chassis includes a housing defining the interior that contains the internal component, and the door, which is movably coupled to the housing. The housing also includes a front face that forms an access port to the internal component within the interior. The door may be alternatively moved to an open position and a closed position. When in the closed position, the door substantially covers the access port to prevent access to the internal component. When in the open position, the door is within the housing interior, thus exposing the internal component to the access port.

33 Claims, 4 Drawing Sheets

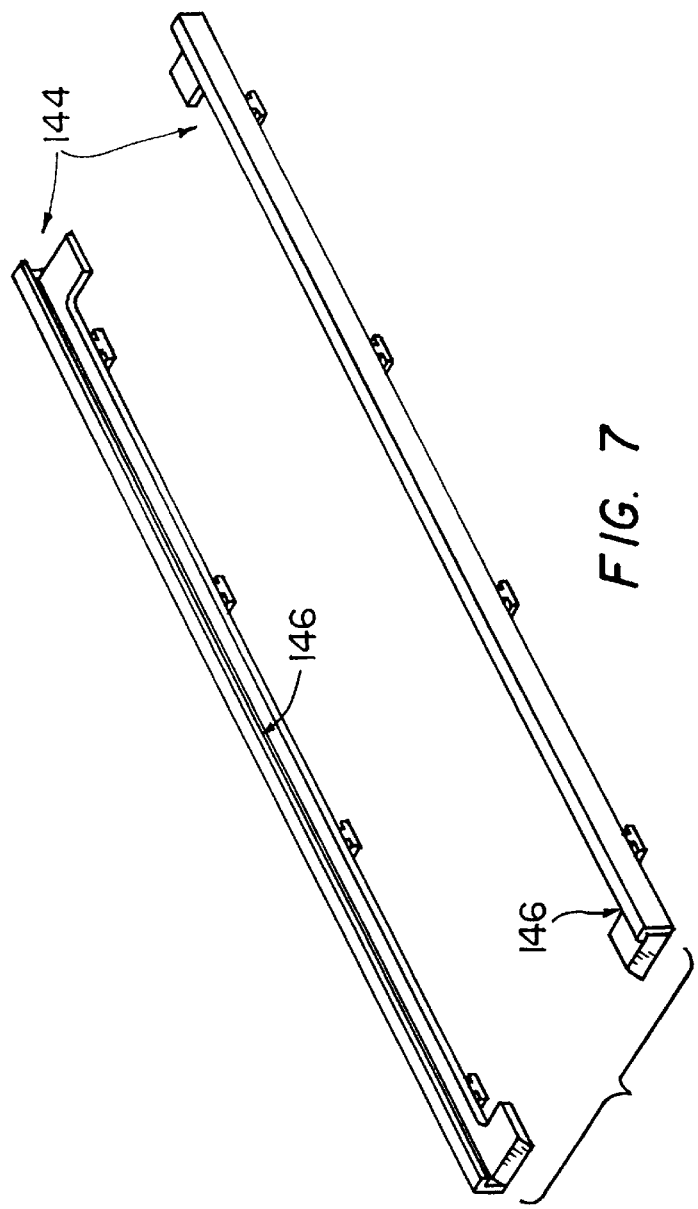
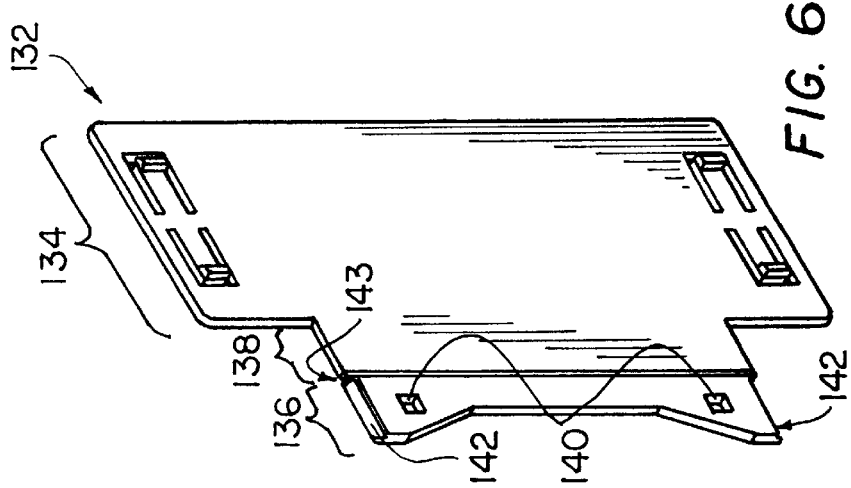

COMPUTER CHASSIS WITH RETRACTABLE ACCESS DOOR

PRIORITY

This application claims priority from copending U.S. patent application Ser. No. 60/077,239, filed Mar. 9, 1998, entitled "COMPUTER EXPANSION SYSTEM WITH IMPROVED COMPUTER CHASSIS", the disclosure of which is incorporated herein, in its entirety, by reference.

FIELD OF THE INVENTION

The invention generally relates to computer systems and, more particularly, the invention relates to doors on a computer chassis.

BACKGROUND OF THE INVENTION

The interior of a computer chassis commonly is accessible via a door pivotably connected to an exterior face of the chassis. To that end, such a computer chassis typically includes an interior that contains internal computer components, an access port for accessing the internal components from the exterior of the chassis, and a door that removably covers the access port. The interior of a computer chassis commonly contains the many well known hardware components included a conventional computer system, such as a motherboard, expansion cards, memory, and system busses. Removable media drives, such as floppy disk drives and CD-ROM drives, also may be contained within the interior of a computer chassis. Accordingly, removable media may be inserted into such drives via the door.

When the interior of such a chassis is accessed, the computer door is pivoted to extend outwardly from the chassis, consequently interfering with access to the internal components within the chassis. For example, while testing an expansion computer card, the computer door may limit the angles that a person may insert testing equipment for testing the card. This limitation may require that the card be removed from the chassis for testing. Removing the card for testing, however, is cumbersome and inconvenient. Moreover, the computer door is more likely to be inadvertently broken off when extending outwardly from the chassis.

SUMMARY OF THE INVENTION

In accordance with one aspect of the invention, an internal component within the interior of a computer chassis is accessible via a chassis door that may be moved into the chassis interior. To that end, the chassis includes a housing defining the interior that contains the internal component, and the door, which is movably coupled to the housing. The housing also includes a front face that forms an access port to the internal component within the interior. The door may be alternatively moved to an open position and a closed position. When in the closed position, the door substantially covers the access port to prevent access to the internal component. When in the open position, the door is within the housing interior, thus exposing the internal component to the access port.

In preferred embodiments, the chassis includes a guide coupled with the door to direct the door into the interior of the housing to expose the internal component. When in the closed position, the door may be positioned between the access port, and the internal component. All or part of the door may be within the interior when in the closed position. The door preferably includes a door face that covers the access port when in the closed position. When in the open position, the door may be substantially entirely within the housing interior. The door may be coupled to the housing in many manners, such as by being pivotably coupled to the front face of the housing, and also being slidable into the interior of the housing. The door also may be retractably coupled to the housing.

In preferred embodiments, the internal component is a removable media drive. For example, the internal component may be a floppy disk drive or a CD-ROM drive. The chassis also may include a hinge for pivotably coupling the door to the housing. A rail also may be included for guiding the hinge within the interior of the housing. The interior of the housing also may form a door retraction area for receiving the door. In particular, at least a part of the door may be within the door retraction area when the door is in the open position. Accordingly, in preferred embodiments, no part of the door is in the door retraction area when the door is in the closed position.

In accordance with other aspects of the invention, a chassis includes a housing defining the interior containing an internal component, a door that is movably coupled to the housing, and a retractor that guides the door within the housing interior. The housing also includes a front face that forms an access port for accessing the internal component. The door is movable to an open position in which the housing interior is exposed via the access port. In some embodiments, the door is movable to a closed position in which the access port is covered, thus preventing access to the internal component.

In accordance with another aspect of the invention, a computer chassis includes a housing with a front face defining an access port for accessing an internal component, and a chassis door that is movably coupled to the housing and adapted to be slidable into the interior of the housing. When in a closed position, the door prevents access to the internal component via the access port. Conversely, when in an open position, the door is positioned in the interior of the chassis, thus exposing the access port and, consequently, exposing the internal component. The chassis may include a hinge for pivotably coupling the door to the front face, and a rail for guiding the hinge within the interior of the housing. In preferred embodiments, the door includes a securing finger for coupling with the front face to secure the door to the front face. In yet other embodiments of the invention, the door includes vents for venting the interior of the housing.

BRIEF DESCRIPTION OF THE DRAWINGS

The foregoing and advantages of the invention will be appreciated more fully from the following further description thereof with reference to the accompanying drawings wherein:

FIG. 6 shows a hinge that may be included in the chassis to retract the chassis door into the chassis interior.

FIG. 7 shows rails that may be included in preferred embodiments of the chassis to retract the chassis door into the chassis interior.

DETAILED DESCRIPTION OF PREFERRED EMBODIMENTS

Figure 1:
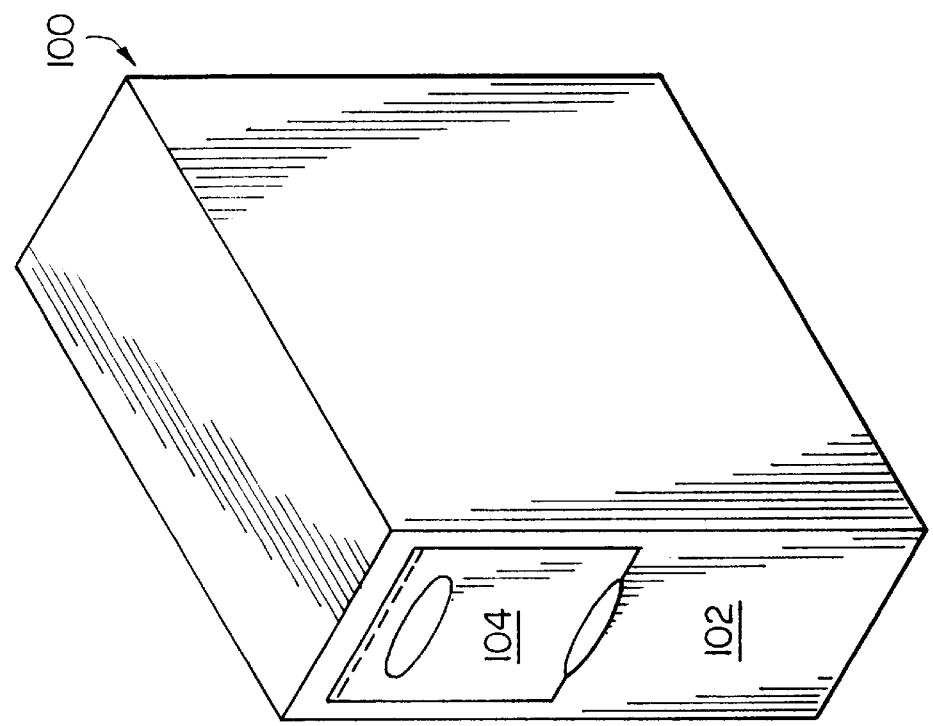
FIG. 1 schematically shows a computer chassis having a retractable chassis door in a closed position.

In accord with preferred embodiments of the invention, a computer chassis 100 includes a chassis door that facilitates unencumbered access to interior components of a computer system (e.g., a computer tower). FIG. 1 schematically shows such a computer chassis 100 arranged in accordance with preferred embodiments of the invention. To that end, the chassis 100 (a/k/a a housing) includes a front face 102 and a movably (e.g., pivotably) coupled chassis door 104. The chassis 100 includes an interior 106 that contains internal computer components, such as 20 removable media drives, a motherboard, an expansion card, and a system bus. When the door 104 is in a closed position, as shown in FIG. 1, the internal components are not physically accessible from the exterior of the chassis 100. In preferred embodiments, the chassis 100 comprises a steel casing with injection molded faces overlaying the steel casing.

Figure 2:
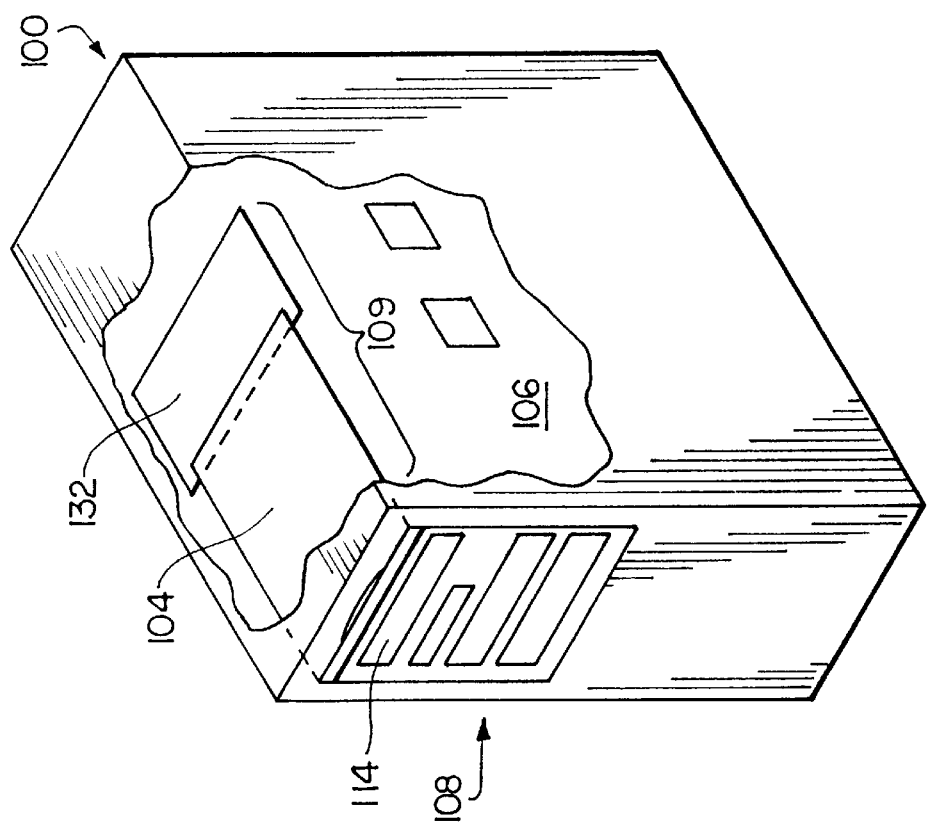
FIG. 2 schematically shows the computer chassis shown in FIG. 1 in an open position with the door retracted into the interior of the chassis.

FIG. 2 schematically shows the computer chassis 100 with the door 104 in an open position that exposes the internal components. More specifically, when in this position, the door 104 is retracted substantially entirely into the interior 106 of the chassis 100 along a top portion of the interior 106. The chassis interior 106 thus may be considered as defining a door retraction area 109 (i.e., shown in FIG. 2 as the part of the interior 106 containing the door 104) that contains at least a part of the door 104 when in the open position. When in this position, the internal components are accessible from the exterior by means of an access port 108 in the front face 102 of the chassis 100. Accordingly, when in the closed position (FIG. 1), the door 104 acts as a barrier by covering the access port 108, thus preventing access to the internal components within the interior 106.

Figure 3:
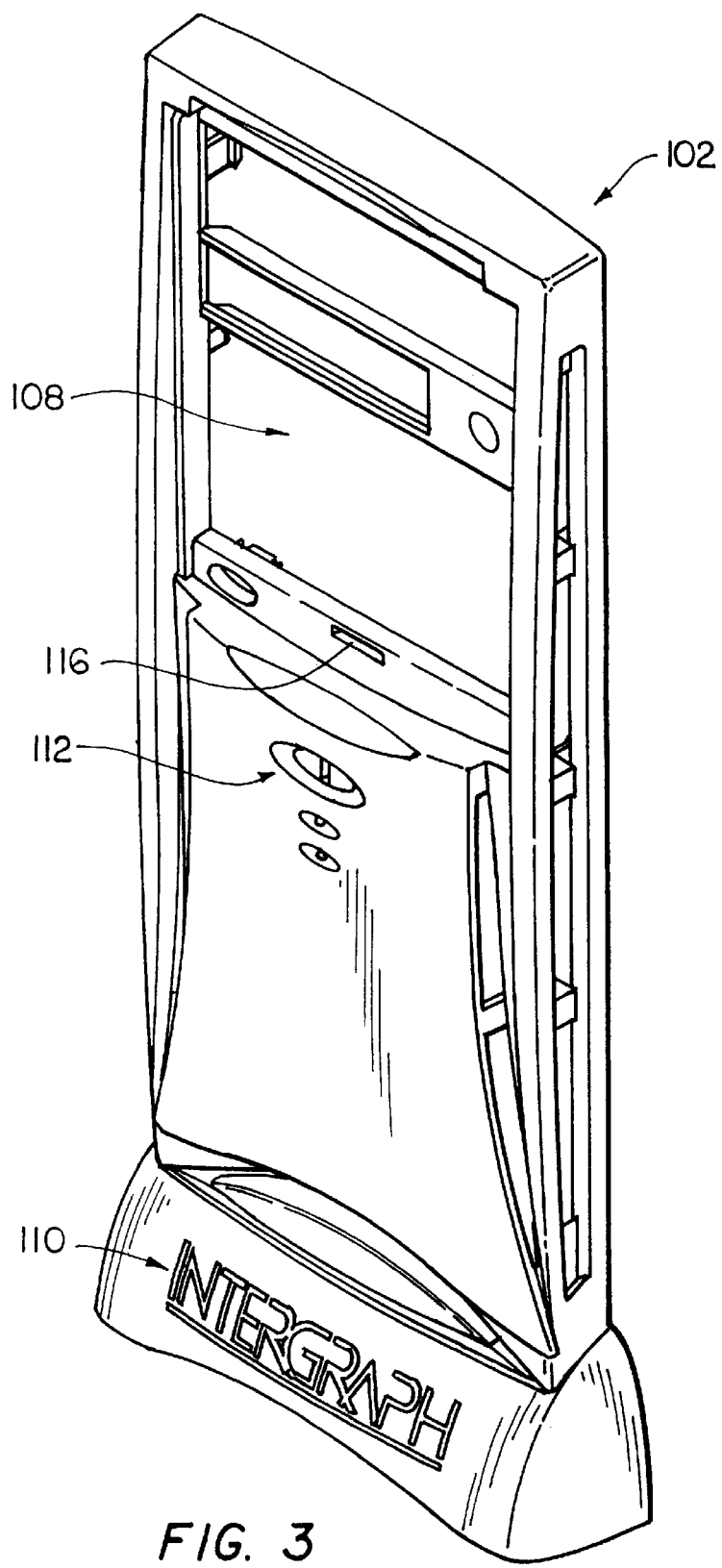
FIG. 3 shows a preferred embodiment of the front face of the computer chassis shown in FIG. 1.
Figure 4:
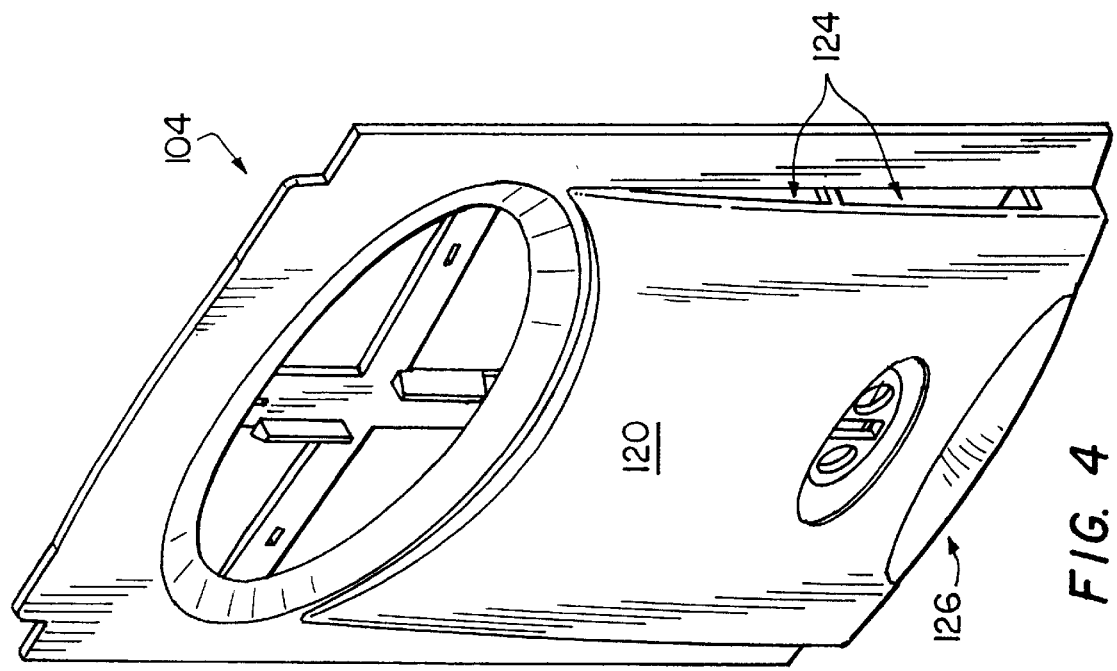
FIG. 4 shows a preferred embodiment of the front side of the chassis door shown in FIG. 1.

FIGS. 3 and 4 respectively show preferred embodiments of the front face 102 and chassis door 104 in greater detail. Among other things, the front face 102 preferably includes the access port 108, indicia 110 for identifying the vendor distributing the computer system, and miscellaneous buttons 112 for controlling the computer. Such buttons 112 may include a simple on/off switch. The access port 108 preferably includes a component slot 114 for aligning with components (e.g., a disk drive) within the chassis interior 106, and a securing slot 116 for coupling with a securing finger 118 extending from the chassis door 104 (FIG. 5) for securing the chassis door 104 in the closed position.

Figure 5:
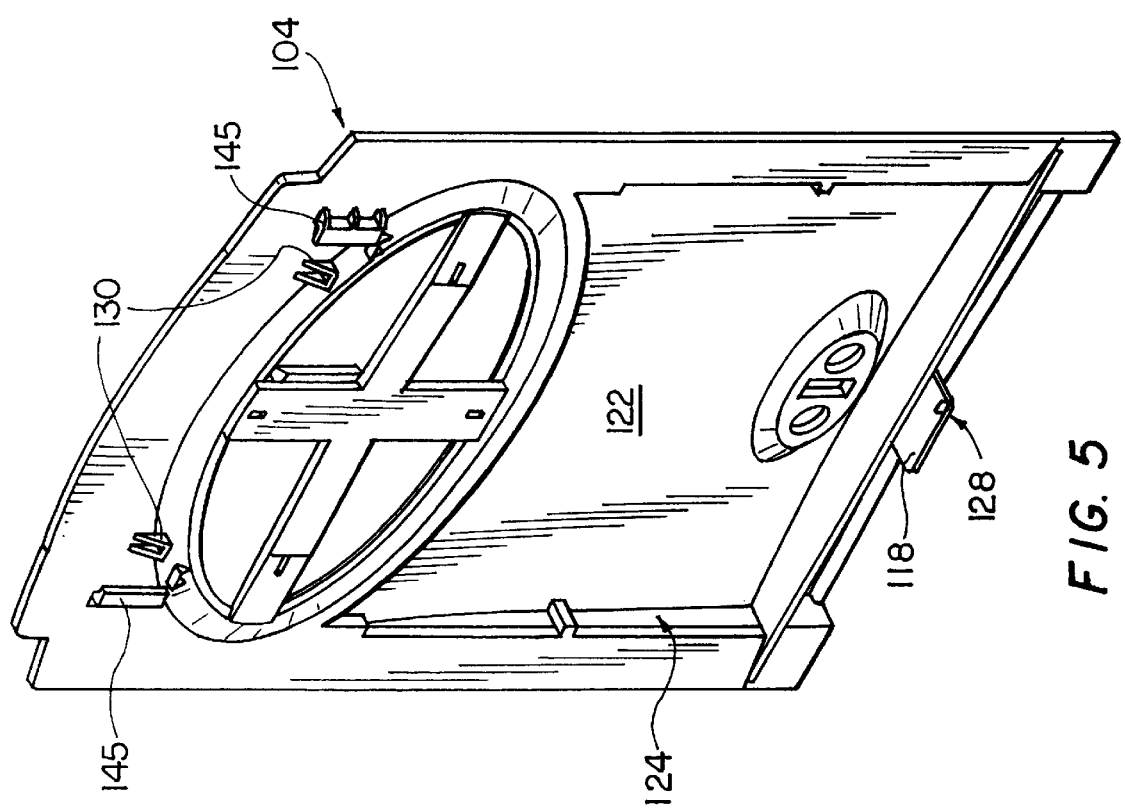
FIG. 5 shows a preferred embodiment of the rear side of the chassis door shown in FIG. 1.

As shown in FIGS. 4 and 5, which respectively show the front 122 and rear 124 of the chassis door 104, the chassis door 104 preferably includes vents 124 for venting the interior 106 of the chassis 100. The vents 124 enable ambient heat produced by the internal components to be vented, thus reducing the likelihood of component failure due to overheating. The chassis door 104 also includes a flared surface 126 for enabling a user to manually uncouple the securing finger 118 from the securing slot 116. Application of an outwardly directed to the flared surface should uncouple the securing finger 118 from the securing slot 116.

The securing finger 118 preferably includes a tooth 128 for latching within the securing slot 116. The finger preferably is manufactured from a relatively flexible material that enables the finger to flex when latching and unlatching with the securing slot 116. In preferred embodiments, the chassis door 104 is manufactured from Cycolac VW300 (available from General Electric Company of Fairfield, Conn.) in accord with conventional injection molding processes. In alternative embodiments, the chassis door 104 is manufactured from Cycoloy C2800, also available from General Electric Company. It should be noted that although the securing finger 118 and securing slot 116 are shown, it should be apparent to those skilled in the art that any known coupling mechanism may be utilized to removably secure the chassis door 104 in the closed position.

The chassis door 104 also includes a pair of tabs 130 for coupling with a hinge 132 that is slidably coupled within the chassis 100. FIG. 6 shows such hinge 132, which includes a sliding portion 134 for sliding along a pair of rails (FIG. 7) within the chassis 100, a connection portion 136 for connecting to the tabs 130 on the chassis door 104, and a hinging portion 138 for enabling the connecting portion 136 to pivot relative to the sliding portion 134. In preferred embodiments, the connecting portion includes two securing holes 140 that interlock in a snap-fit with the tabs 130 on the door 104, and a pair of registration slots 142 that couple with a pair of corresponding registration fingers 145 on the back side of the door 104 (FIG. 5). The hinging portion 138 preferably includes a U-shaped 143 groove that enables the door 104 to pivot at least ninety degrees between the open position and the closed position.

The hinge 132 preferably is slidably coupled within a pair of rails 144 that are secured within the chassis 100. FIG. 7 shows the rails 144, which include corresponding grooves 146 having a thickness that is substantially identical to that of the chassis door 104 and hinge 132. The rails 144 preferably have a length dimension that is sufficiently large enough to enable the chassis door 104 to be substantially entirely contained within the chassis 100 (i.e., in the door retraction area 109) when in the open position.

It should be noted that although the hinge 132 and cooperating rails 144 have been shown to retract the chassis door 104, other known retraction mechanisms may be utilized to retract the chassis door 104 within the chassis 100. For example, the door 104 may be slid into the interior 106 in any direction without requiring that it be pivoted outwardly. Accordingly, although preferred embodiments pivot the door 104, alternative embodiments merely slide the door 104 into the door retraction area 109. Moreover, in many embodiments, only a part of the door 104 is slid into the door retraction area 109. Specifically, only enough of the door 104 to permit access to the interior components via the access port 108 is retracted into the interior 106 of the housing 100.

Accordingly, when in use, the interior 106 of the chassis 100 may be accessed by first applying a slight outward force to the flared surface 126 on the chassis door 104 to unlatch the securing finger 118 from the securing slot 116. The chassis door 104 then may be pivoted upwardly until in substantially the same plane as that defined by the grooves 146 in the rails 144. A slight inwardly directed force then may be applied to the chassis door 104 to slide the door 104 into the interior 106 of the chassis 100. As noted above, when necessary, the chassis door 104 may be slid substantially entirely (or partially, as deemed necessary) into the interior 106 of the chassis 100. When re-closing the door 104, a slight outwardly directed force may be applied to the chassis door 104 until the hinging portion 138 of the hinge 132 is substantially exterior to the chassis 100. At that point, the door 104 may pivot downwardly. Once pivoted downwardly, a slight inwardly directed force may be applied to the door 104 to latch the securing finger 118 with the securing slot 116 in the access port 108.

In alternative embodiments, the chassis door 104 may be pivotable to other parts of the front face 102 such as, for example, the bottom or the sides of the chassis door 104.

Similarly, the chassis door 104 may be entirely removable and slid into the chassis 100 via the rails 144.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A computer chassis that contains an internal component, the computer chassis comprising:
   a housing defining an interior containing the internal component, the housing further including a front face that forms an access port to the internal component;
   a door movably coupled to the housing,
   the door being movable to an open position and a closed position,
   when in the closed position, the door substantially covering the access port to prevent access to the internal component,
   when in the open position, the door being within the housing interior and exposing the internal component to the access port, the internal component being usable when the door is in the closed position.

2. The computer chassis as defined by claim 1 further comprising:
   a guide coupled with the door to direct the door into the interior of the housing to expose the internal component.

3. The computer chassis as defined by claim 1 wherein a part of the door is within the interior when in the closed position.

4. The computer chassis as defined by claim 1 wherein the door includes a door face that covers the access port when in the closed position.

5. The computer chassis as defined by claim 1 wherein when in the open position, the door is substantially entirely within the housing interior.

6. The computer chassis as defined by claim 1 wherein the door is pivotably coupled to the front face and slidable into the interior of the housing.

7. The computer chassis as defined by claim 1 wherein the door is retractably coupled to the housing.

8. The computer chassis as defined by claim 1 wherein the internal component include a removable media drive.

9. The computer chassis as defined by claim 1 further comprising a hinge for pivotably coupling the door to the housing, the hinge including a sliding portion for sliding along a rail within the chassis, a connection portion for connecting to the door, a hinging portion that permits the connection portion to pivot relative to the sliding portion.

10. The computer chassis as defined by claim 1 wherein the housing interior defines a door retraction area, at least a part of the door being within the door retraction area when in the open position, no part of the door being in the retraction area when the door is in the closed position.

11. The computer chassis as defined by claim 1 wherein when in the closed position, the door is positioned between the access port and the internal component.

12. The computer chassis as defined by claim 1 wherein the chassis has a height dimension and a width dimension, the height dimension being greater than the width dimension.

13. The computer chassis as defined by claim 9 further comprising a rail for guiding the hinge within the interior of the housing.

14. A computer chassis defining an interior having an interior component, the computer chassis comprising:
   a housing defining an interior containing the internal component, the housing further including a front face defining an access port for accessing the internal component;
   a door movably coupled to the housing, the door being movable to an open position that exposes the internal component to the access port,
   the door being movable to a closed position,
   when in the closed position, the door substantially covering the access port to prevent access to the internal component,
   a retractor that guides the door within the housing interior to expose the access port when in the open position,
   the internal component being usable when the door is in the closed position.

15. The computer chassis as defined by claim 14 wherein the door is movable to a closed position, the door covering the access port when in the closed position.

16. The computer chassis as defined by claim 14 wherein the door is pivotably and slidably coupled to the housing.

17. The computer chassis as defined by claim 14 wherein the internal component includes a removable media drive.

18. The computer chassis as defined by claim 14 wherein the interior of the housing defines a door retraction area, at least a part of the door being in the door retraction area when in the open position.

19. The computer chassis as defined by claim 14 wherein the chassis has a height dimension and a width dimension, the height dimension being greater than the width dimension.

20. The computer chassis as defined by claim 15 wherein the door is positioned between the component and the access port when in the closed position.

21. A computer chassis defining an interior having an internal component, the computer chassis comprising:
   a housing defining an interior containing the internal component, the housing having front face defining an access port for accessing the internal component within the housing interior; and
   a door movably coupled to the housing,
   the door being slidable into the interior of the housing,
   the door being in an open position when in the interior of the housing to permit access to the internal component,
   the door being movable to a closed position that prevents access to the internal component, the internal component being usable when the door is in the closed position.

22. The computer chassis as defined by claim 21 wherein the door is movable between a closed position that covers the access port, and an open position that exposes the access port.

23. The computer chassis as defined by claim 21 further comprising a hinge for pivotably coupling the door to the front face, the hinge including a sliding portion for sliding along a rail within the chassis, a connection portion for connecting to the door, a hinging portion that permits the connection portion to pivot relative to the sliding portion.

24. The computer chassis as defined by claim 21 further comprising a securing finger for coupling with the front face to secure the door to the front face.

25. The computer chassis as defined by claim 21 wherein the door includes vents for venting the interior of the housing.

26. The computer chassis as defined by claim 21 wherein the chassis has a height dimension and a width dimension, the height dimension being greater than the width dimension.

27. The computer chassis as defined by claim 23 further comprising a rail for guiding the hinge within the interior of the housing.

28. A computer chassis defining an interior having an internal component, the computer chassis comprising:
- a housing defining an interior that contains the internal component, the housing having a front face defining an access port for accessing the internal component within the housing interior;
- a door pivotably coupled to the housing; and
- means for sliding the door into the interior of the housing, the door being in an open position when in the interior of the housing to permit access to the internal component,
- the door being movable to a closed position,
- when in the closed position, the door substantially covering the access port to prevent access to the internal component, the internal component being usable when the door is in the closed position.

29. The computer chassis as defined by claim 28 wherein the sliding means includes a pair of rails for guiding the door into the interior.

30. The computer chassis as defined by claim 28 wherein the sliding means includes a hinge pivotably coupled to the door, the hinge including a sliding portion for sliding along a rail within the chassis, a connection portion for connecting to the door, a hinging portion that permits the connection portion to pivot relative to the sliding portion.

31. The computer chassis as defined by claim 28 wherein the door includes vents for venting the interior of the housing.

32. The computer chassis as defined by claim 28 wherein the door is movable between a closed position that covers the access port, and an open position that exposes the access port.

33. The computer chassis as defined by claim 28 wherein the chassis has a height dimension and a width dimension, the height dimension being greater than the width dimension.

* * * * *